(12) United States Patent
Makhlevich et al.

(10) Patent No.: US 11,526,603 B2
(45) Date of Patent: Dec. 13, 2022

(54) MODEL FOR IDENTIFYING THE MOST RELEVANT PERSON(S) FOR AN EVENT ASSOCIATED WITH A RESOURCE

(71) Applicant: MICROSOFT TECHNOLOGY LICENSING, LLC, Redmond, WA (US)

(72) Inventors: Michael Makhlevich, Haifa (IL); Andrey Karpovsky, Haifa (IL); Tomer Rotstein, Haifa (IL)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 305 days.

(21) Appl. No.: 16/835,001

(22) Filed: Mar. 30, 2020

(65) Prior Publication Data
US 2021/0303684 A1 Sep. 30, 2021

(51) Int. Cl.
*G06F 21/55* (2013.01)
*G06N 20/00* (2019.01)
*G06F 16/2457* (2019.01)

(52) U.S. Cl.
CPC ...... *G06F 21/554* (2013.01); *G06F 16/24578* (2019.01); *G06N 20/00* (2019.01); *G06F 2221/034* (2013.01)

(58) Field of Classification Search
CPC .. G06F 21/554; G06F 16/24578; G06N 20/00
USPC ........................................................ 726/23
See application file for complete search history.

(56) References Cited

U.S. PATENT DOCUMENTS

| | | | |
|---|---|---|---|
| 10,339,309 B1* | 7/2019 | Kling | G06F 16/9024 |
| 10,721,262 B2* | 7/2020 | Zorlular | H04L 63/1416 |
| 2017/0063900 A1* | 3/2017 | Muddu | H05K 999/99 |
| 2017/0171158 A1 | 6/2017 | Hoy et al. | |
| 2018/0167402 A1* | 6/2018 | Scheidler | G06N 20/00 |
| 2018/0183827 A1* | 6/2018 | Zorlular | H04L 63/1441 |
| 2018/0189697 A1* | 7/2018 | Thomson | H04L 63/1408 |
| 2018/0248902 A1* | 8/2018 | Dãnilã-Dumitrescu | H04L 63/1425 |
| 2018/0293533 A1* | 10/2018 | Lowry | G06Q 10/06316 |

(Continued)

OTHER PUBLICATIONS

"International Search Report and Written Opinion Issued in PCT Application No. PCT/US21/016690", dated Apr. 26, 2021, 12 Pages.

*Primary Examiner* — Dereena T Cattungal
(74) *Attorney, Agent, or Firm* — Newport IP, LLC; Jacob P. Rohwer

(57) ABSTRACT

Disclosed herein is a system that implements a model for automatic discovery and identification of a person who is most relevant to handle a notification generated for a resource based on a triggered event. The model accesses an activity log for the resource to identify operations that are relevant to a type of the event. The operations are performed by different users (e.g., owners of the shared resource). The model then calculates an operation relevance score for each of the operations and a user relevance score for each of the different users. The user relevance scores are used to identify a most relevant person from the different users. Contact information for the most relevant person (e.g., name, email address, phone number) is added to the notification so that a person that first views the notification can efficiently forward the notification to the person best positioned to deal with the event.

20 Claims, 8 Drawing Sheets

(56) References Cited

U.S. PATENT DOCUMENTS

| | | | | |
|---|---|---|---|---|
| 2019/0147076 A1* | 5/2019 | Yang | ............... | G06F 16/2228 |
| | | | | 707/741 |
| 2020/0204574 A1* | 6/2020 | Christian | ............. | H04L 9/3239 |
| 2020/0285737 A1* | 9/2020 | Kraus | ................ | G06F 21/554 |
| 2020/0351295 A1* | 11/2020 | Nhlabatsi | ............ | H04L 63/1441 |

* cited by examiner

| User | User Relevance Score |
|---|---|
| sue@ABCinc.com | 237 |
| tim@ABCinc.com | 97 |
| beth@ABCinc.com | 11 |
| sally@ABCinc.com | 6 |
| joe@ABCinc.com | 0 |

← Highest User Relevance Score 302

FIG. 3A

| User | User Relevance Score |
|---|---|
| sue@ABCinc.com | 237 |
| tim@ABCinc.com | 97 |
| beth@ABCinc.com | 11 |
| sally@ABCinc.com | 6 |
| joe@ABCinc.com | 0 |

Top-K User Relevance Scores 304

FIG. 3B

| User | User Relevance Score |
|---|---|
| sue@ABCinc.com | 237 |
| tim@ABCinc.com | 97 |
| beth@ABCinc.com | 11 |
| sally@ABCinc.com | 6 |
| joe@ABCinc.com | 0 |

User Relevance Scores that Exceed a Threshold (e.g., 75) 306

FIG. 3C

MODEL FOR IDENTIFYING THE MOST RELEVANT PERSON(S) FOR AN EVENT ASSOCIATED WITH A RESOURCE

BACKGROUND

Security is an important aspect for platforms that offer network services. As cloud computing gains popularity, more and more sensitive data and/or services are stored and provided online. Consequently, computer security has become more crucial than ever before. Network providers are especially interested in keeping resources safe to help protect their clients' assets and to avoid legal liability.

In many scenarios, an entity that operates a cloud-based platform uses a security center to review potential security issues, or threats, associated with resources. Accordingly, these security centers are configured to implement threat detection systems for resources used by clients. A resource may be one that the entity controls (e.g., a cloud-based server, datacenter network components, etc.) and/or one that the entity has the responsibility to monitor (e.g., an on-premises server, a registered user device, etc.). The security center is configured to notify, via the use of an alert, security officers of threats that may need to be investigated in order to identify mitigation actions.

Typically, an alert includes information that helps a security officer understand the threat and take the necessary steps to resolve the threat. For example, this information can include a type of the threat, potential consequences of the threat if not properly handled, etc. In many cases, it is important to identify who, in a client organization, should handle the alert to determine whether mitigation actions are needed or whether the alert can be dismissed as insignificant. For instance, an alert is typically first sent to a security officer who is tasked with forwarding the alert to an administrator of a resource on which the threat was detected. The administrator is most likely the person with the required privileges and/or knowledge to investigate the alert and to take action to mitigate the threat.

However, identifying an administrator of a resource for the purposes of forwarding an alert can be a cumbersome and time-consuming task. This is because multiple different users often share the use of a resource in larger client organizations (e.g., over fifty people). Stated alternatively, multiple different administrators often qualify as "owners" of a shared resource in accordance with a defined policy that provides privileges and authorization for the different administrators to configure the shared resource. To put this into perspective based on actual feedback received from clients of cloud-based platforms, up to eighty percent of the total amount of time used to investigate and mitigate an alert is often spent attempting to identify and contact the person in a client organization who is best positioned to investigate and mitigate the alert. The other twenty percent of the total amount of time used is actually directed to the more important steps involved in investigating and mitigating the alert itself.

In a more extreme example where the alert warns of a more serious threat that can result in severe consequences if not addressed immediately, a group of administrators around the world need to be hurriedly interrupted from their professional and/or social lives (e.g., woken up from sleep, removed from a social event, taken out of a meeting, etc.) so the group can collectively deduce who the best person to investigate and mitigate the alert is and so this person can be contacted. The clear downside of this type of situation is the delayed investigation and mitigation of the threat, which can prove to be vital in certain alert situations such as a sensitive data breach.

One known solution to this problem relies upon the maintenance of documentation, by a security officer team, that defines which administrators that own a resource are responsible for handling different types of alerts and threats. Consequently, a security officer can manually reference this documentation to identify the person best positioned to handle an alert. However, this solution is largely ineffective because the documentation is not typically updated in a timely manner (e.g., real-time), if updated at all. Moreover, it still may take a security officer a significant amount of time (e.g., tens of minutes) to access the documentation and to identify the person best positioned to handle an alert.

It is with respect to these and other considerations that the disclosure made herein is presented.

SUMMARY

The techniques disclosed herein enable a system to automatically identify a most relevant person for handling a notification of a triggered event using an activity log associated with a resource. In one example, the notification is an alert and the event is triggered by the detection of a threat on the resource. In another example, the event is triggered by a maintenance action such as an update (e.g., hardware, software, and/or firmware) that is to be installed on, or pushed to, the resource. In yet another example, the event is triggered due to the expiration of credentials (e.g., a user password, a certificate, etc.) associated with the resource. In even a further example, the event is triggered due to the inactivity of a user account associated with the resource. The techniques described herein can be used in association with other types of triggered events where identifying and contacting a most relevant person for a resource is important or can be helpful.

The most relevant person, and corresponding contact information for the most relevant person, is displayed in a notification so that a person (e.g., a security officer) tasked with forwarding or delivering the notification is effectively informed of the person that is best positioned to deal with the event. For example, the most relevant person is likely best positioned to investigate and mitigate a detected threat that causes an alert. When the threat is detected, prompt and adequate action by someone that has a good understanding of the processes being implemented on the resource is important for successful and efficient mitigation of the threat. The techniques described herein shorten the total mitigation time and effort for the alert, thereby enhancing the security and the protection of the resource and providing a security officer with more time to review and forward other alerts.

A shared resource can include a physical resource such as a server, a storage device, a user device (e.g., a personal computer, a tablet computer, a smartphone, etc.), a networking device, a physical network, and so forth. The shared resource can additionally or alternatively comprise a virtual resource such as a virtual machine, a container, a virtual network, and so forth. The shared resource may be one that is under control of an entity operating a monitoring center configured to determine when an event is triggered. Or, the shared resource may be one that is configured to be monitored by the monitoring center. Consequently, the most relevant person may be part of a client organization that has contracted with a network provider to use a shared resource that the network provider is monitoring. In the example of security, a security officer may be employed by the entity operating the monitoring center or by the client organization.

The system described herein implements a model for automatic discovery and identification of a person who is most relevant to a specific notification generated for a shared resource. The model uses a type of the event (e.g., a server has been accessed from a previously unseen Internet Protocol (IP) address, update XYZ is to be installed on the server, etc.), accesses an activity log of operations performed on the shared resource that are relevant to the type of the event, calculates an operation relevance score for each relevant operation, and calculates a user relevance score for each of a plurality of different users that performed the relevant operations.

In one example, the person with the highest user relevance score is assigned the most relevant person status, and this person's identity and contact information (e.g., email, phone number, etc.) is added to the notification. In another example, the "top-k" persons (e.g., k equals two, three, four, etc.) with the top-k user relevance scores are assigned the most relevant person status, and the identities and contact information for each of these persons is added to the notification. In yet another example, the person(s) with user relevance scores that exceed a threshold user relevance score are assigned the most relevant person status, and the identities and contact information for each of these person(s) is added to the notification.

In the context of security, examples of threats a security monitoring center can detect can be related to an unauthorized or new access (e.g., a new IP address), a distributed denial of service (DDoS) attack, the installation of malware on a shared resource, a brute force attack, a phishing campaign, etc. Accordingly, different types of threats can be determined based on a manner in which a resource is compromised and/or a description of a threat. Threats may be detected manually or automatically by different systems and/or by different people. For example, a threat may be detected automatically by threat detection systems (e.g., anti-malware software) implemented on the resource and/or via a cloud-based platform. In another example, threats may be detected via client reports submitted through a portal configured within the cloud-based platform. When a threat is detected for a shared resource based on a suspicious operation performed on the shared resource, data associated with the threat may be sent from the shared resource to the security monitoring center. The data may include an identification of the shared resource, a type of the threat, and a timestamp associated with when the threat was detected or when the suspicious operation is performed.

Upon detection of a triggered event, such as a threat, on a shared resource, the system accesses an activity log that includes previous operations that are determined to be relevant to the triggered event and that are performed on the shared resource by a plurality of different users. In one example, a previous operation is determined to be relevant to the triggered event if the previous operation was performed in a recent time window (e.g., the last hour, last twenty-four hours, the last week, the last month, etc.) established based on when the event is triggered. The recent time window can be a predefined amount of time before the event is triggered. In another example, a previous operation is determined to be relevant to the triggered event if the previous operation is performed by a person that is authorized to "configure" the shared resource in accordance with a policy established for a client organization. In some instances, this authorized person may be referred to as an administrator or owner of the shared resource.

Accordingly, the activity log can include operations sorted into different planes. Alternatively, a shared resource may include different activity logs that correspond to the different planes. A first plane includes a data plane in which common operations (e.g., data read, data write, resource access, etc.) are performed by a first set of users of the shared resource (e.g., all the users in a client organization that use the shared resource). A suspicious operation for which a threat is detected and for which an alert is generated may occur in the data plane. A second plane includes a control plane in which "configuration" operations are performed by a second set of users of the shared resource. The second set of users is most likely a smaller set compared to the first set of users because the second set includes a limited number of people (e.g., developers) authorized to change a configuration state of the shared resource. To illustrate, the configuration state manages or governs the use of the shared resource by persons in the first set of users.

The system uses a model to calculate an operation relevance score for each previous operation, thereby producing multiple operation relevance scores. An operation relevance score is calculated using a significance rating and an age rating. The significance rating is determined based on an association between a type of the previous configuration operation and information associated with the triggered event (e.g., a type of the threat detected based on a suspicious operation). The age rating represents an amount of time between a time when the previous operation is performed and a time when the event is triggered (e.g., a suspicious operation is performed). The amount of time may be based on a broad or granular time unit (e.g., a number of days, a number of hours, a number of minutes, a number of seconds).

The model then calculates a user relevance score for each user, thereby producing multiple user relevance scores. A user relevance score is calculated using a subset of the operation relevance scores that correspond to a subset of the previous configuration operations performed by, or attributed to, a specific user. For example, the model may sum the subset of operation relevance scores to arrive at a user relevance score. Other ways of calculating a user relevance score are also contemplated (e.g., averaging the subset of operation relevance scores, using a median of the subset of operation relevance scores, etc.).

The model uses the user relevance scores calculated for the different users to identify at least one most relevant person to receive the notification associated with the triggered event. For instance, the most relevant person may be best positioned to investigate an alert and mitigate a threat. In one example, the most relevant person is identified as the person with the highest user relevance score. In another example, multiple most relevant persons can be identified. The system can then cause a notification that indicates the at least one most relevant person to deal with the triggered event to be displayed via a graphical user interface.

This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter. The term "techniques," for instance, may refer to system(s), method(s), computer-readable instructions, module(s), algorithms, hardware logic, and/or operation(s) as permitted by the context described above and throughout the document.

BRIEF DESCRIPTION OF THE DRAWINGS

The Detailed Description is described with reference to the accompanying figures. In the figures, the left-most digit(s) of a reference number identifies the figure in which the reference number first appears. The same reference numbers in different figures indicate similar or identical items. References made to individual items of a plurality of items can use a reference number with a letter of a sequence of letters to refer to each individual item. Generic references to the items may use the specific reference number without the sequence of letters.

FIG. 3A illustrates user relevance scores that are calculated using the operation relevance scores, and how the most relevant person can be identified according to a first embodiment.

FIG. 3B illustrates user relevance scores that are calculated using the operation relevance scores, and how the most relevant person(s) can be identified according to a second embodiment.

FIG. 3C illustrates user relevance scores that are calculated using the operation relevance scores, and how the most relevant person(s) can be identified according to a third embodiment.

DETAILED DESCRIPTION

The following Detailed Description discloses techniques and technologies for implementing a model for automatic discovery and identification of a person who is most relevant to receive a notification generated for a shared resource based on a triggered event. The model accesses an activity log of operations performed on the shared resource to identify operations that are relevant to a type of the event. The operations are performed by different users (e.g., administrators or designated owners of the shared resource). The model then calculates an operation relevance score for each of the identified operations, as well as a user relevance score for each of the different users. The user relevance scores are used to identify a most relevant person. Contact information for the most relevant person (e.g., name, email address, phone number) is added to the notification so that a person that first sees the notification can efficiently forward the notification to the person best positioned to deal with the event. For example, a security officer can easily view a person that is best positioned to investigate an alert and mitigate a threat that has been detected on a shared resource.

Various examples, scenarios, and aspects of the disclosed techniques are described below with reference to FIGS. 1-7.

Figure 1:
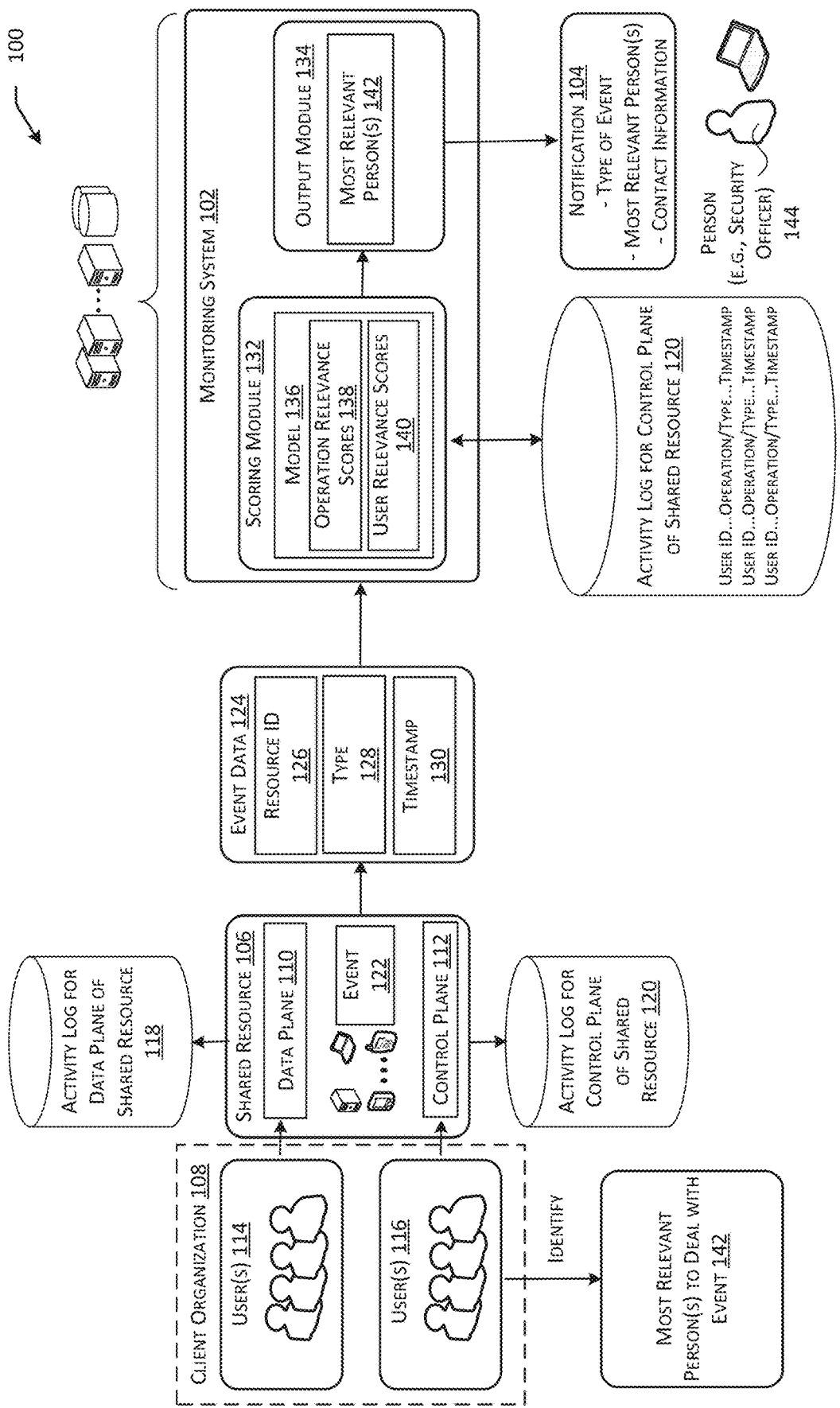
FIG. 1 is a diagram illustrating an example environment in which a monitoring system, e.g., supporting a security center, is configured to identify a most relevant person for receiving a notification of an event associated with a resource.

FIG. 1 is a diagram illustrating an example environment 100 in which a monitoring system 102 is configured to identify a most relevant person to receive a notification 104. FIG. 1 illustrates a shared resource 106 that is configured for use by a client organization 108. The shared resource 106 can include a physical resource such as a server, a storage device, a user device (e.g., a personal computer, a tablet computer, a smartphone, etc.), a networking device, a physical network, and so forth. The shared resource 106 can additionally or alternatively comprise a virtual resource such as a virtual machine, a container, a virtual network, and so forth. Accordingly, the shared resource 106 may be one that is under control of an entity operating the monitoring system 102 (e.g., a network provider of a cloud-based platform). Or, the shared resource 106 may be one that is under control of the client organization 108 yet is configured to be monitored by the monitoring system 102.

In various examples, use of the shared resource 106 can be split into different planes such as a data plane 110 and a control plane 112. In other words, an operation performed via the shared resource 106 may occur in one of the data plane 110 or the control plane 112. More specifically, common "data" operations (e.g., data read, data write, resource access, etc.) typically occur in the data plane 110 of the shared resource 106 and are performed by a first set of users 114 in the client organization 108. Further, "configuration" operations typically occur in the control plane 112 of the shared resource 106 and are performed by a second set of users 116. The second set of users 116 is most likely a smaller set compared to the first set of users 114 because the second set of users 116 includes a limited number of people (e.g., developers) authorized to change a configuration state of the shared resource 106. Users in the second set 116 may be referred to as administrators or owners of the shared resource 106.

Accordingly, one or more activity logs can be maintained and updated over time to reflect the operations performed on the shared resource 106. In one example, a first activity log 118 is maintained and updated to reflect the operations that occur in the data plane 110 of the shared resource 106, and a second activity log 120 is maintained and updated to reflect the operations that occur in the control plane 112 of the shared resource 106. Alternatively, the shared resource 106 may include a single activity log in which different operations can be labeled as data operations that occur in the data plane 110 or configuration operations that occur in the control plane 112. The labels can be used to sort and/or identify the operations that occur in the different planes. The example environment 100 illustrates that the activity logs can be maintained at the shared resource 106 or at the monitoring system 102.

FIG. 1 further illustrates that an event 122 associated with the shared resource. In one example, the event 122 is triggered in the data plane 110 of the shared resource 106. For instance, the event 122 may be a threat detected based on a suspicious operation performed by one of the users 114, or some external user or device that is implementing a malicious cyberattack on the shared resource 106. Threat detection mechanisms (e.g., monitoring software) can be used by the monitoring system 102 and/or the shared resource 106 to detect the threat. The threat represents a situation where the shared resource 106 may be susceptible or exposed to a potential security issue, and therefore, further investigation is warranted and mitigation actions may be needed. In one example, the threat can be associated with an unauthorized or previously unseen data access for the shared resource 106 (e.g., a previously unseen Internet Protocol (IP) address has accessed a server). In another example, the threat can be associated with a cyberattack that attempts to gain access to the shared resource 106 by "cracking" user passwords (e.g., a brute force attack to guess passwords). In yet another example, the threat can be associated with a cyberattack that installs malware or other types of malicious software on the shared resource 106.

Alternatively, the event 122 can be triggered in the control plane 112 of the shared resource or by another resource (e.g., an update server). For example, the event 122 can correspond to a maintenance action such as an update (e.g., hardware, software, and/or firmware) that is to be installed on, or pushed to, the shared resource 106. In this situation, the shared resource 106 may need to be shut down or taken offline, and thus, it may be beneficial to contact a relevant resource owner to ensure that a shut down or network disconnection is acceptable for a particular time period.

In another example, the event 122 can correspond to the expiration of credentials (e.g., a user password, a certificate, etc.) associated with the shared resource 106. In this situation, it may be beneficial to contact a relevant resource owner to determine whether a specific user password or a certificate should be allowed to expire based on whether the corresponding user is still using the shared resource 106 (e.g., the user may have switched teams, the user may have left the client organization, etc.).

In yet another example, the event 122 can correspond to the inactivity of a user account associated with the shared resource 106. In this situation, it may be beneficial to contact a relevant resource owner to determine whether the user account should be removed from the shared resource 106 due to inactivity or infrequent activity. This can potentially save costs for the client organization 108 if a subscription payment is based on a number of user accounts established for the shared resource 106.

The techniques described herein can be used in association with other types of triggered events where identifying and contacting a most relevant person for a resource is important or can be helpful.

Based on a triggered event 122, event data 124 can be sent from the shared resource 106 to the monitoring system 102. The event data 124 can include an identification 126 of the shared resource 106, a type 128 of the event (e.g., a description, a title, a name, etc.), and a timestamp 130 which corresponds to when the event 122 is triggered (e.g., when a threat is detected or when a suspicious operation is performed).

The monitoring system 102 is configured to receive the event data 124 and/or generate its own event data 124. The monitoring system 102 can comprise device(s) and/or other components that communicate with one another and/or with the shared resource 106 via network(s). Moreover, the monitoring system 102 can include a scoring module 132 and an output module 134. The number of illustrated modules is just an example, and the number can vary higher or lower. That is, functionality described herein in association with the illustrated modules can be performed by a fewer number of modules or a larger number of modules on one device or spread across multiple devices.

The scoring module 132 is configured to calculate scores so that a most relevant person for handling a notification 104 generated based on the event 122 can be identified. To do this, the scoring module 132 uses the resource identification 126 to access the corresponding activity log 120 that includes previous operations performed on the shared resource 106. The scoring module 132 determines operations in the activity log 120 that are relevant to the event 122. In one example, a previous operation is determined to be relevant to the event 122 if the previous operation was performed in a recent time window (e.g., the last hour, last twenty-four hours, the last week, the last month) established based on the timestamp 130. The recent time window can be a predefined amount of time before the timestamp 130. In another example, a previous operation is determined to be relevant to the event 122 if the previous operation is performed by users 116 that are authorized to configure the shared resource 106 in accordance with a policy established for the client organization 108, and thus, the relevant previous operations may be limited to those that occur in the control plane 112 of the shared resource 106.

Consequently, FIG. 1 illustrates that the activity log 120 includes a sequence of line items that identify a user identification that performed an operation at a time marked by a timestamp. The timestamp is used to ensure that a corresponding operation is performed within the recent time window. In various examples, the scoring module 132 uses a model 136 to calculate an operation relevance score for each previous operation determined to be relevant to the event 122, thereby producing multiple operation relevance scores 138. As further described herein with respect to FIG. 2, an operation relevance score is calculated using a significance rating and an age rating.

The model 136 further calculates a user relevance score for each user of the different users that perform the operations determined to be relevant to the event 122, thereby producing multiple user relevance scores 140. As further described herein, a user relevance score is calculated using a subset of the operation relevance scores 138 that correspond to a subset of the relevant previous operations performed by, or attributed to, a specific user.

The model 136 uses the user relevance scores 140 calculated for the different users to identify one or more most relevant person(s) 142, from the group of users 116, to deal with the event 122. For example, when the event 122 is a threat and the notification 104 is an alert, the most relevant person(s) are likely best positioned to investigate the alert and mitigate the threat. In one example, the most relevant person 142 is identified as the person with the highest user relevance score. In another example, multiple most relevant persons can be identified.

The output module 134 is configured to generate the notification 104 and display the notification 104 for a person 144 tasked with forwarding or delivering the notification to the most relevant person. In the example where the notification 104 is an alert, the person 144 may be a security officer of a security center. The notification 104 indicates who the most relevant person 142 is, and also includes contact information (e.g., email address, phone number, etc.) for the most relevant person 142. As described above, the person 144 may be employed by an entity operating the monitoring system 102 (e.g., a network provider) or by the client organization 108.

Consequently, the information displayed to the person 144 via a graphical user interface provides added value with respect to understanding the context of the event 122 and the notification 104. This helps the person 144 to quickly forward or deliver the notification 104 to the person who is likely best positioned to deal with the event 122.

It is understood in the context of this invention that the monitoring system 102 can replicate the aforementioned functionality across a large number of resources and/or a large number of client organizations. Accordingly, in various examples, device(s) of the monitoring system 102 can include one or more computing devices that operate in a cluster or other grouped configuration to share resources, balance load, increase performance, provide fail-over support or redundancy, or for other purposes. For instance, device(s) of the monitoring system 102 can belong to a variety of classes of devices such as server-type devices, desktop computer-type devices, mobile-type devices, special purpose-type devices, embedded-type devices, and/or wearable-type devices. A client device used by the person 144 can include, but is not limited to, a desktop computer, a game console and/or a gaming device, a tablet computer, a personal data assistant (PDA), a mobile phone/tablet hybrid, a laptop computer, a telecommunication device, a wearable device, a work station, or any other sort of computing device.

Figure 2:
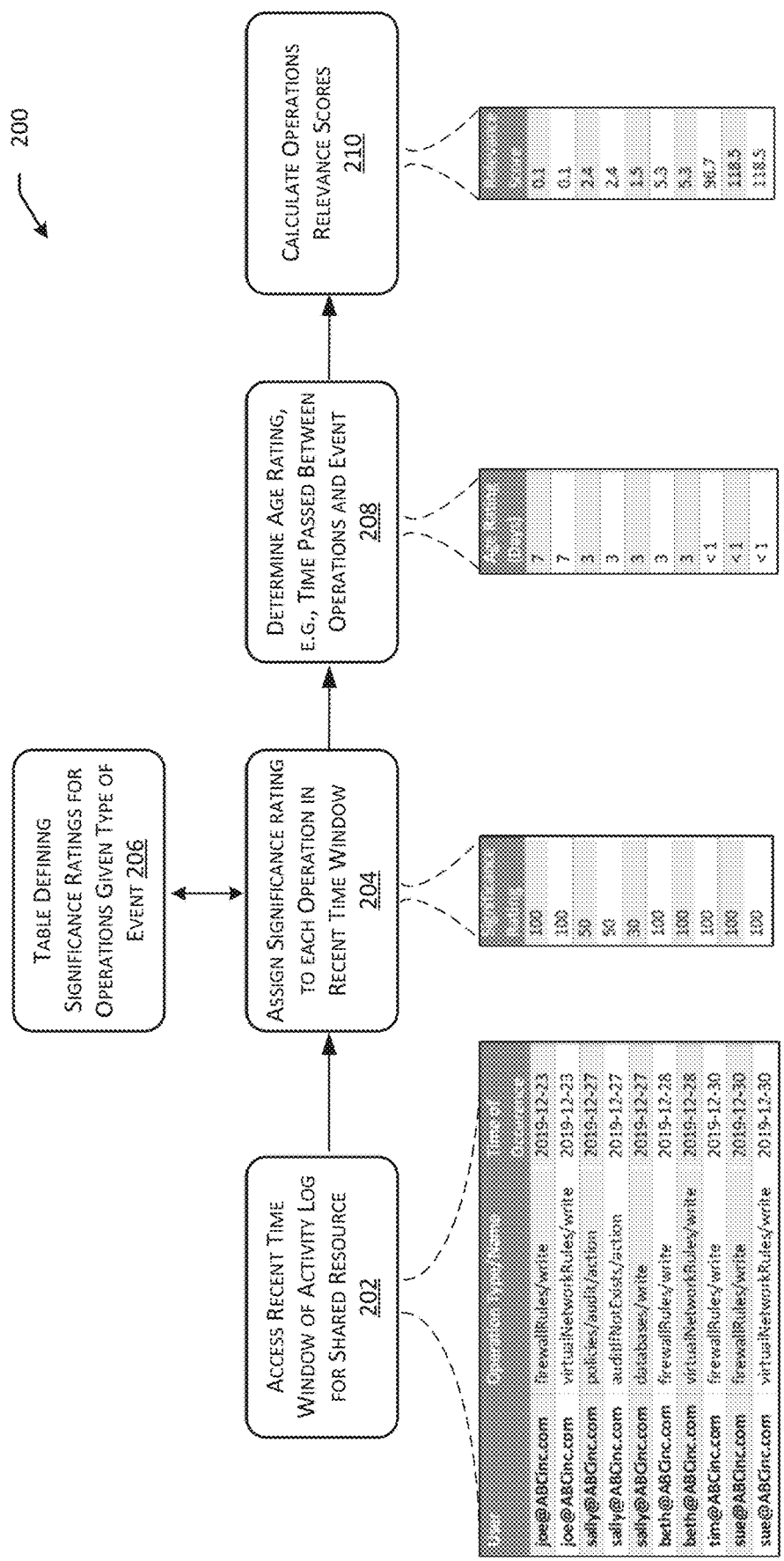
FIG. 2 is a block diagram illustrating different stages applied to determine a most relevant person for a specific notification.

FIG. 2 is a block diagram 200 illustrating different stages applied to determine a most relevant person for a specific notification. As described above, the scoring module 132 is configured to employ a model 136 to identify the most relevant person 142 given the event data 124 and information included in an activity log 120 of the shared resource 106. As shown by block 202, the model 136 accesses previous operations that occur within a recent time window. The recent time window may be a predefined amount of time. In this example, the previous operations are performed between Dec. 23, 2019 and Dec. 30, 2019, so assuming the event is triggered on Dec. 30, 2019, the predefined amount of time is eight days (e.g., the most recent eight days).

As shown, the activity log lists different user identifications for administrators of the shared resource (e.g., joe@ABCinc.com, sally@ABCinc.com, beth@ABCinc.com, tim@ABCinc.com, and sue@ABCinc.com). The activity log also lists the type of configuration operations (e.g., a name, a description, etc.) performed, such as a "firewallRules/write" operation, a "virtualNetworkRules/write" operation, a "policies/audit/action" operation, an "auditifNotExists/action" operation, and a "databases/write" operation. Finally, the activity log lists time of occurrence for a corresponding operation based on some defined time unit (e.g., a specific day, a specific hour, a specific minute, etc.).

As shown by block 204, the model 136 assigns a significance rating to each operation in the recent time window. In various examples, the significance rating is determined based on an association between a type of the previous operation in the activity log and a type 128 of the event 122. For example, the model 136 may be configured to map the previous operation in the activity log to a corresponding predetermined significance rating stored in a significance rating table 206 that lists operation-specific significance ratings for the type 128 of the event 122. In the illustrated example, the "firewallRules/write" operation is assigned a significance rating of 100, the "virtualNetworkRules/write" operation is assigned a significance rating of 100, the "policies/audit/action" operation is assigned a significance rating of 50, the "auditifNotExists/action" operation is assigned a significance rating of 50, and the "databases/write" is assigned a significance rating of 30. The significance ratings may be determined by the monitoring system 102 and/or the client organization 108.

As shown by block 208, the model 136 then determines an age rating for each of the previous operations. In various examples, the age rating represents an amount of time between a time when the previous operation is performed and a time when the event 122 is triggered (e.g., when a threat is detected). The amount of time may be based on a broad or granular time unit (e.g., a number of days, a number of hours, a number of minutes, a number of seconds). In the illustrated example, the "firewallRules/write" operation performed by Joe has an age rating of seven days, the "virtualNetworkRules/write" operation performed by Joe has an age rating of seven days, the "policies/audit/action" operation performed by Sally has an age rating of three days, the "auditifNotExists/action" operation performed by Sally has an age rating of three days, the "databases/write" performed by Sally has an age rating of three days, the "firewallRules/write" operation performed by Beth has an age rating of three days, the "virtualNetworkRules/write" operation performed by Beth has an age rating of three days, the "firewallRules/write" operation performed by Tim has an age rating of less than a day, the "firewallRules/write" operation performed by Sue has an age rating of less than a day, and the "virtualNetworkRules/write" operation performed by Sue has an age rating of less than a day.

Next at block 210, the model 136 calculates an operation relevance score for each operation. In one example, the operation relevance score is the significance rating weighted by a decay coefficient based on the age rating so that the relevance score for an operation is directly proportional to both significance and recency.

In a more specific example, for a specific notification generated for an event that occurs at time t on shared resource r, the model 136 is configured to go through all the operations performed by users on the shared resource r in a pre-defined time window (e.g., one day, one week, one month, etc.) before time t. As described above, these operations may be limited to configuration operations that occur in the control plane 112 of the shared resource r.

The model 136 assigns each relevant operation a significance rating based on operation o relevance to the specific notification n (e.g., describing a type of the event 122), which can be represented as follows:

$s_{o,n}$—significance rating of operation o in relation to notification n

In addition, the model 136 determines an age rating for each operation, which represents the time passed, e.g., in number of hours or days, as follows:

$h_{o,t}$—age of operation o in relation to alert time t

Consequently, the relevance score per operation can be calculated by the model 136 as follows:

$$r_{o,n} = s_{o,n} \cdot e^{-h_{o,t}}$$

As shown in FIG. 2, the operation relevance score for the "firewallRules/write" operation performed by Joe is 0.1, the operation relevance score for the "virtualNetworkRules/write" operation performed by Joe is 0.1, the operation relevance score for the "policies/audit/action" operation performed by Sally 2.4, the operation relevance score for the "auditifNotExists/action" operation performed by Sally is 2.4, the operation relevance score for the "databases/write" performed by Sally is 1.5, the operation relevance score for the "firewallRules/write" operation performed by Beth is 5.3, the operation relevance score for the "virtualNetworkRules/write" operation performed by Beth is 5.3, the operation relevance score for the "firewallRules/write" operation performed by Tim is 96.7, the operation relevance score for the "firewallRules/write" operation performed by Sue is 118.5, and the operation relevance score for the "virtualNetworkRules/write" operation performed by Sue is 118.5.

FIG. 3A illustrates user relevance scores that are calculated using the operation relevance scores, and how the most relevant person can be identified using the user relevance scores according to a first embodiment. In one example, the model 136 sorts the relevant operations in the activity log according to user identifications, thereby producing subsets of operations performed by the different users. The model 136 can then sum the subset of operation relevance scores that correspond to a subset of operations performed by a specific user u, to arrive at a user relevance score, as follows:

$$r_{u,n} = \Sigma s_{o,n}$$

However, other ways of calculating a user relevance score are also contemplated (e.g., averaging the subset of operation relevance scores, using a median of the subset of operation relevance scores, etc.).

FIG. 3A shows user relevance scores that have been calculated by the model 136 and rounded to whole numbers. More specifically, the user relevance score calculated for Sue is 237 (i.e., 118.5+118.5), the user relevance score calculated for Tim is 97 (i.e., Tim only performed one operation with an operation relevance score of 97), the user relevance score calculated for Beth is 11 (i.e., 5.3+5.3), the user relevance score calculated for Sally is 6 (i.e., 2.4+2.4+1.5), and the user relevance score calculated for Joe is 0 (i.e., 0.1+0.1).

In the example of FIG. 3A, the most relevant person is identified as the person (e.g., Sue) with the maximum, or highest, user relevance score 302, as follows:

$$\text{MRP} = \text{argmax}(r_{u,n})$$

FIG. 3B illustrates user relevance scores that are calculated using the operation relevance scores, and how the most relevant person(s) can be identified using the user relevance scores according to a second embodiment. In FIG. 3B, the user relevance scores are calculated in a similar manner as that discussed above with respect to FIG. 3A. However, in the example of FIG. 3B, multiple most relevant persons can be identified. To do this, the scoring module 132 may be configured to select the top-k users (e.g., k equals two in the illustrated example). It may be beneficial to identify and contact more than one most relevant person because one of them may be currently unavailable. Or, because recent activity is used to identify the most relevant persons, a malicious user using stolen credentials may be identified as a most relevant person. Thus, if the alert is only sent to this malicious user, the threat will not be mitigated. However, if the alert is sent to multiple most relevant persons, then the activity being performed by the malicious user can be stopped.

FIG. 3C illustrates user relevance scores that are calculated using the operation relevance scores, and how the most relevant person(s) can be identified using the user relevance scores according to a third embodiment. In FIG. C, the user relevance scores are calculated in a similar manner as that discussed above with respect to FIG. 3A. However, in the example of FIG. 3C, multiple most relevant persons can be identified. To do this, a threshold user relevance score (e.g., 75) can be preset, and users that have a user relevance score that exceeds the threshold user relevance score 306 can be identified as most relevant persons (e.g., Sue and Tim in the example of FIG. 3B).

Figure 4:
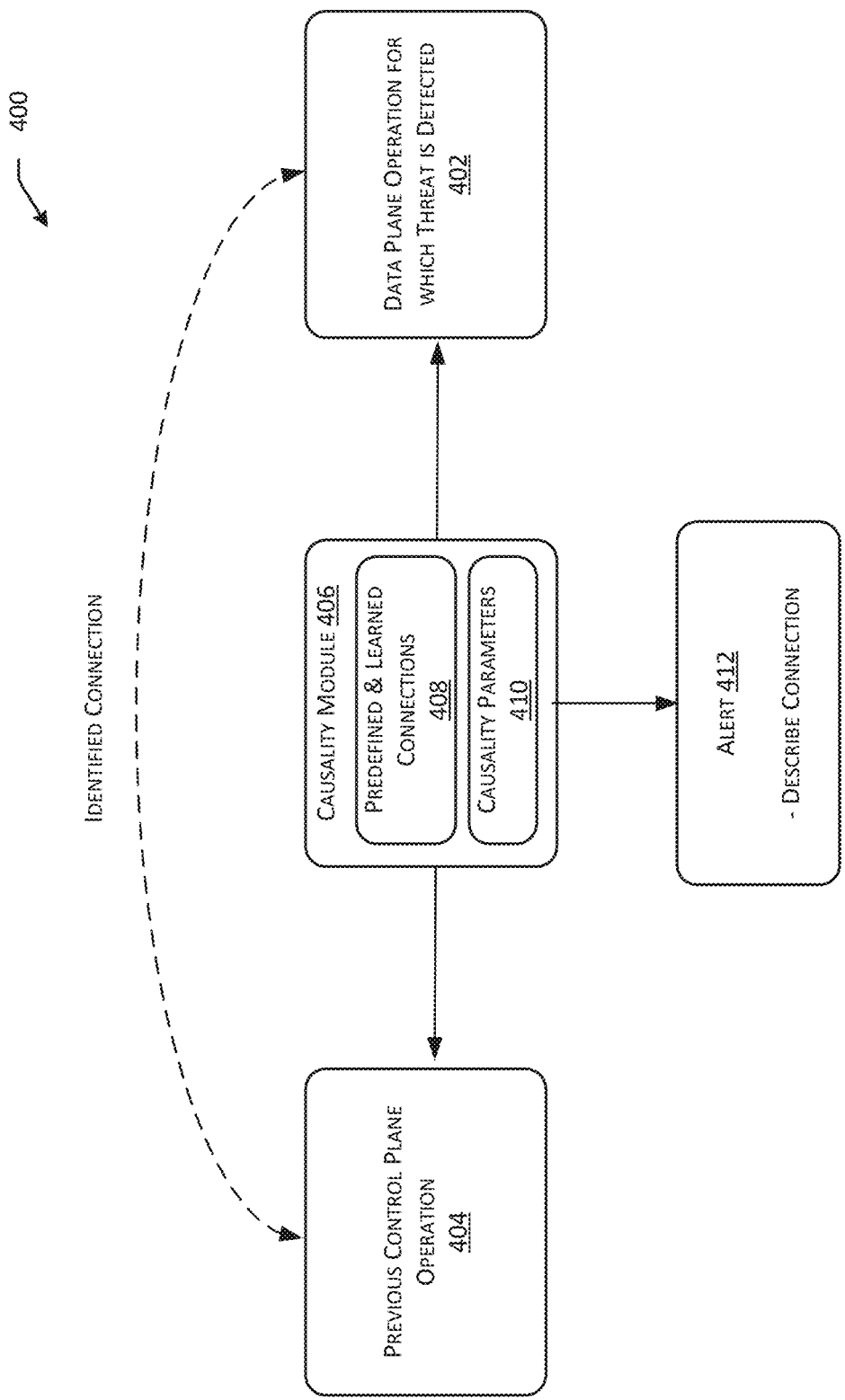
FIG. 4 is a block diagram illustrating how an identified connection can be established between an event and previous configuration operation.

FIG. 4 is a block diagram 400 illustrating how an identified connection can be established between a data plane operation for which a threat is detected 402 and a previous control plane operation 404. FIG. 4 illustrates a causality module 406 that stores predefined and/or learned connections 408. These connections represent relationships between previous control plane operations and data plane operations that cause alerts.

For example, the previous control plane operation 404 may alter the configuration of a firewall to allow access to a new IP address and the data plane operation for which the threat is detected 402 may be a data access by the new IP address. The causality module 406 can use different causality parameters 410, such as an acceptable time period, to identify a connection between a suspicious operation and a previous operation, and to lessen the severity of an alert. For example, an acceptable time period can be used to determine that a new IP address access may not be suspicious because the configuration of the firewall was altered shortly before (e.g., within five minutes, within an hour, etc.) the new IP address access occurred. In other words, an owner of the resource intentionally altered the configuration state of the resource to allow for the data access via the new IP address.

A description of this identified connection can then be added to the alert 412 so the security officer and/or the most relevant person(s) can be immediately informed that the alert is being sent out of an abundance of caution and that the suspicious activity can be explained. Alternatively, the identified connection can be used to suppress the alert.

The connections between two operations and the causality parameters (e.g., an acceptable time period in which the two operations must occur) can be predefined by a user (e.g., an owner of the resource). Alternatively, supervised learning can be used to learn the connections and the causality parameters based on human feedback (e.g., labeled training data). For example, owners or resources may commonly dismiss specific types of alerts that are triggered right after a specific type of configuration operation is performed. This feedback can be used to learn the connection between operations 402 and 404 based on a causality parameter 410. Various machine learning techniques may be utilized, such as classification analysis, regression analysis, clustering, Naïve Bayes, k-nearest neighbor algorithm, majority classifier, support vector machines, random forests, boosted trees, Classification and Regression Trees (CART), neural networks, and so on.

Figure 5A:
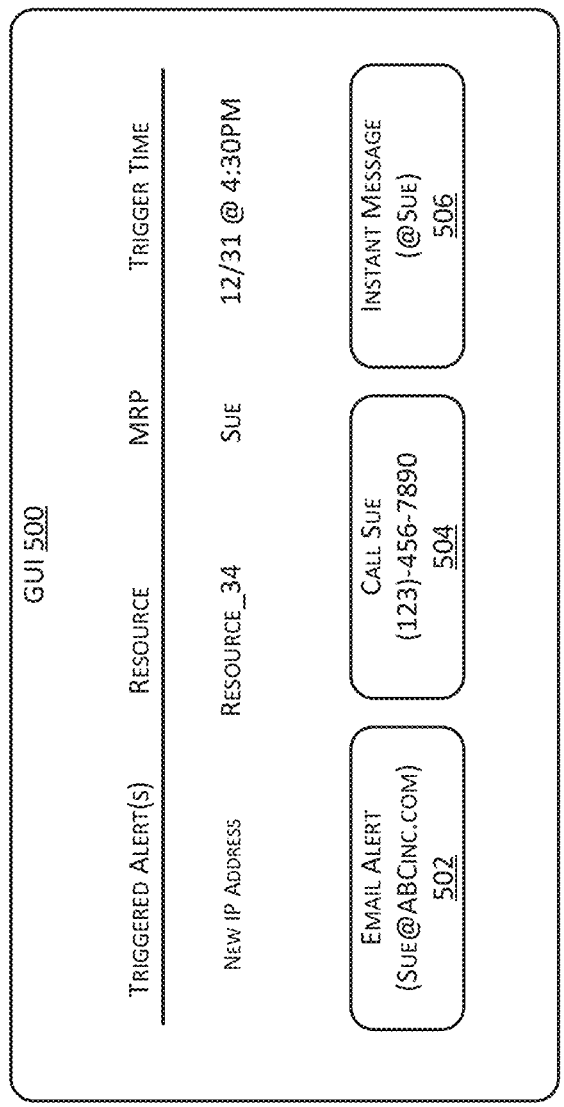
FIG. 5A is an example graphical user interface illustrating an example notification (e.g., an alert) indicating a most relevant person.

FIG. 5A is an example graphical user interface 500 illustrating an example notification (e.g., an alert) indicating a most relevant person. As shown, the graphical user interface 500 indicates a type of an alert (e.g., a data access by a new IP address), a resource from which the alert is triggered (e.g., Resource_34), the most relevant person (MRP—Sue), and a time when the alert is triggered (e.g., December 31 @ 4:30 pm). Moreover, the graphical user interface 500 can include selectable elements that enable a security officer to quickly forward the alert and/or contact the most relevant person. These selectable elements can include an option 502 to email the alert to Sue, an option 504 to call Sue, and/or an option 506 to instant message and chat with Sue.

In various examples, the alert can also include the operations performed by Sue that caused her to be the most relevant person. For instance, the alert can indicate that Sue recently performed a "firewallRules/write" operation and a "virtualNetworkRules/write" operation on the shared resource, in order to provide Sue with context and enable her to gain a more efficient understanding once the alert is forwarded to her and she views the alert.

Figure 5B:
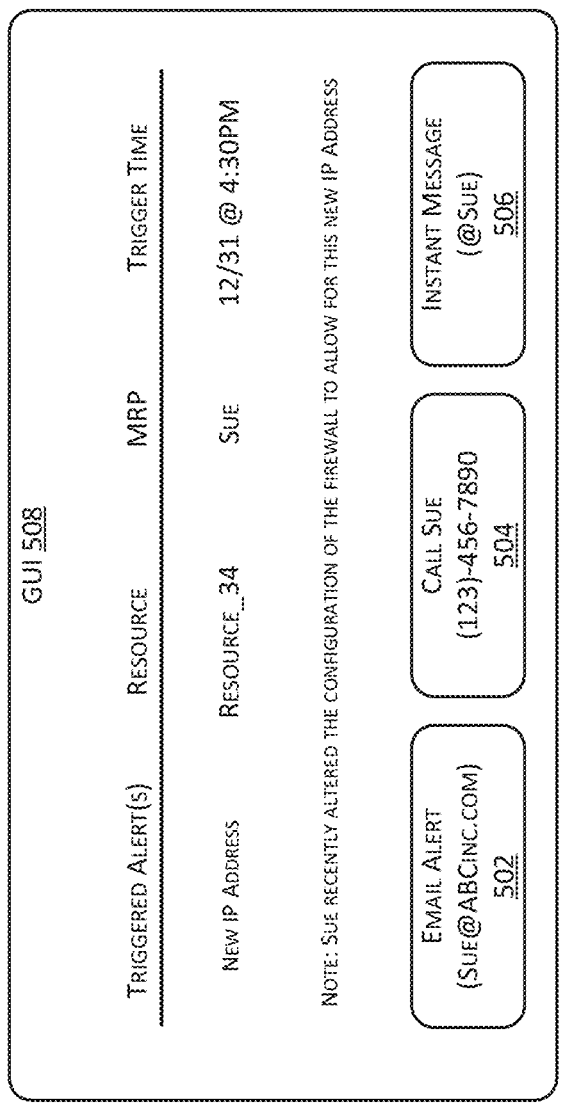
FIG. 5B is an example graphical user interface illustrating an example notification (e.g., an alert) indicating a most relevant person and an identified connection between a previous configuration operation and an event that triggered the notification.

FIG. 5B is an example graphical user interface 508 illustrating notification (e.g., an alert) indicating a most relevant person and an identified connection. The graphical user interface 508 is the same as FIG. 5A, except that a note describing an identified connection is included for additional context. The note states that "Sue recently altered the configuration of the firewall to allow for this new IP address". This note and additional context may remove an element of stress for the security officer and/or an owner of the resource when they first view the alert.

Figure 6:
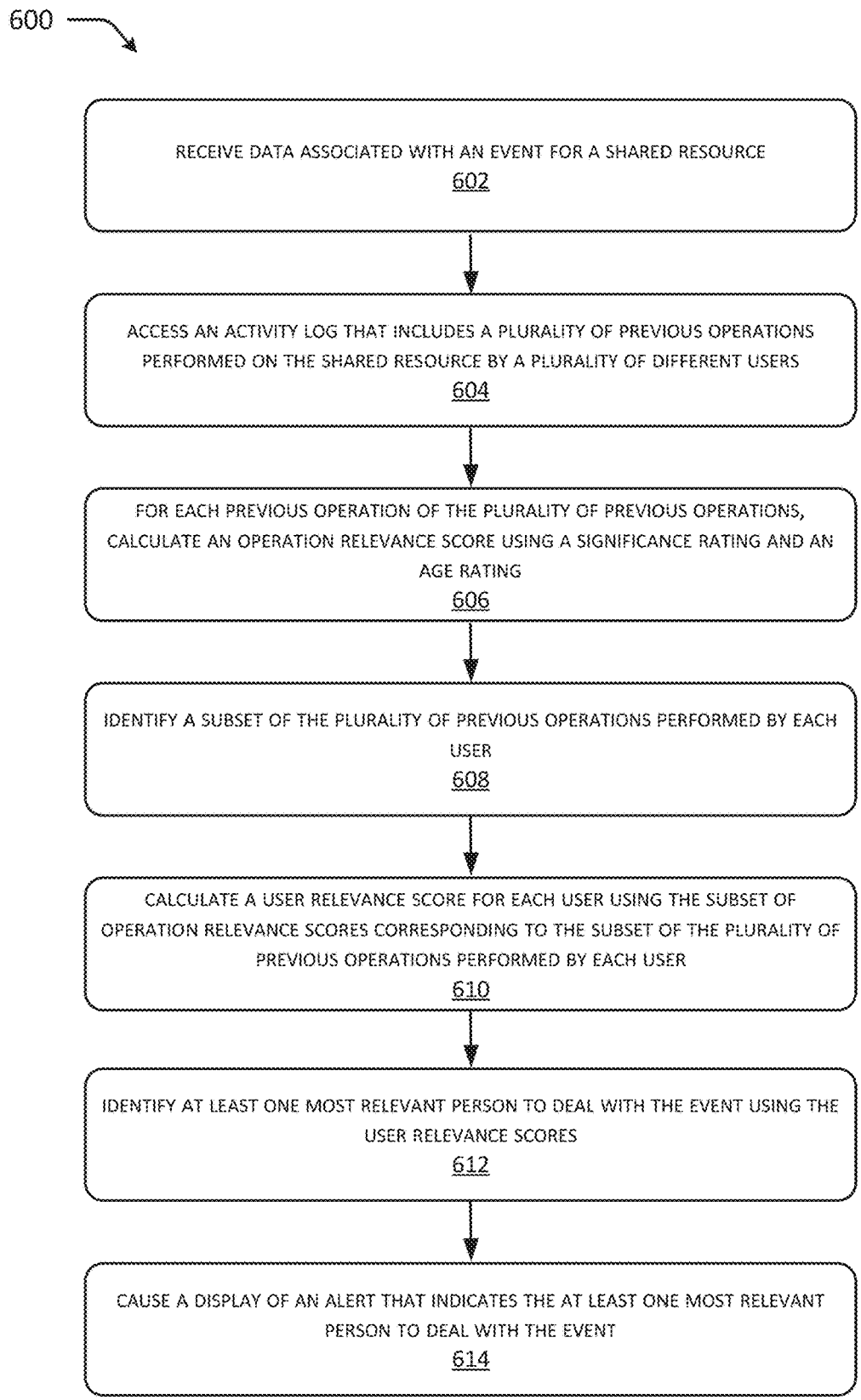
FIG. 6 is a flow diagram of an example method for identifying a most relevant person to be included in a notification.

FIG. 6 represents an example process in accordance with various examples from the description of FIGS. 1-5B. The example operations shown in FIG. 6 can be implemented on or otherwise embodied in one or more device(s) of the monitoring system 102.

The order in which the operations are described is not intended to be construed as a limitation, and any number of the described operations can be combined in any order and/or in parallel to implement each process. Moreover, the operations in FIG. 6 can be implemented in hardware, software, and/or a combination thereof. In the context of software, the operations represent computer-executable instructions that, when executed by one or more processing units, cause one or more processing units to perform the recited operations. For example, modules and other components described herein can be stored in a computer-readable media and executed by at least one processing unit to perform the described operations.

FIG. 6 is a flow diagram of an example method 600 for identifying a most relevant person to be included in an alert.

At operation 602, data associated with an event for a shared resource is received.

At operation 604, an activity log that includes a plurality of previous operations performed on the shared resource is accessed. The plurality of previous operations may be performed by a plurality of different users in a control plane of the shared resource.

At operation 606, an operation relevance score is calculated for each previous operation of the plurality of previous operations using a significance rating and an age rating.

At operation 608, a subset of the plurality of previous operations performed by each user is identified.

At operation 610, a user relevance score is calculated for each user using the subset of operation relevance scores corresponding to the subset of the plurality of previous operations performed by each user.

At operation 612, at least one most relevant person to deal with the event is identified using the user relevance scores.

At operation 614, a notification that indicates the at least one most relevant person to deal with the event is caused to be displayed.

Figure 7:
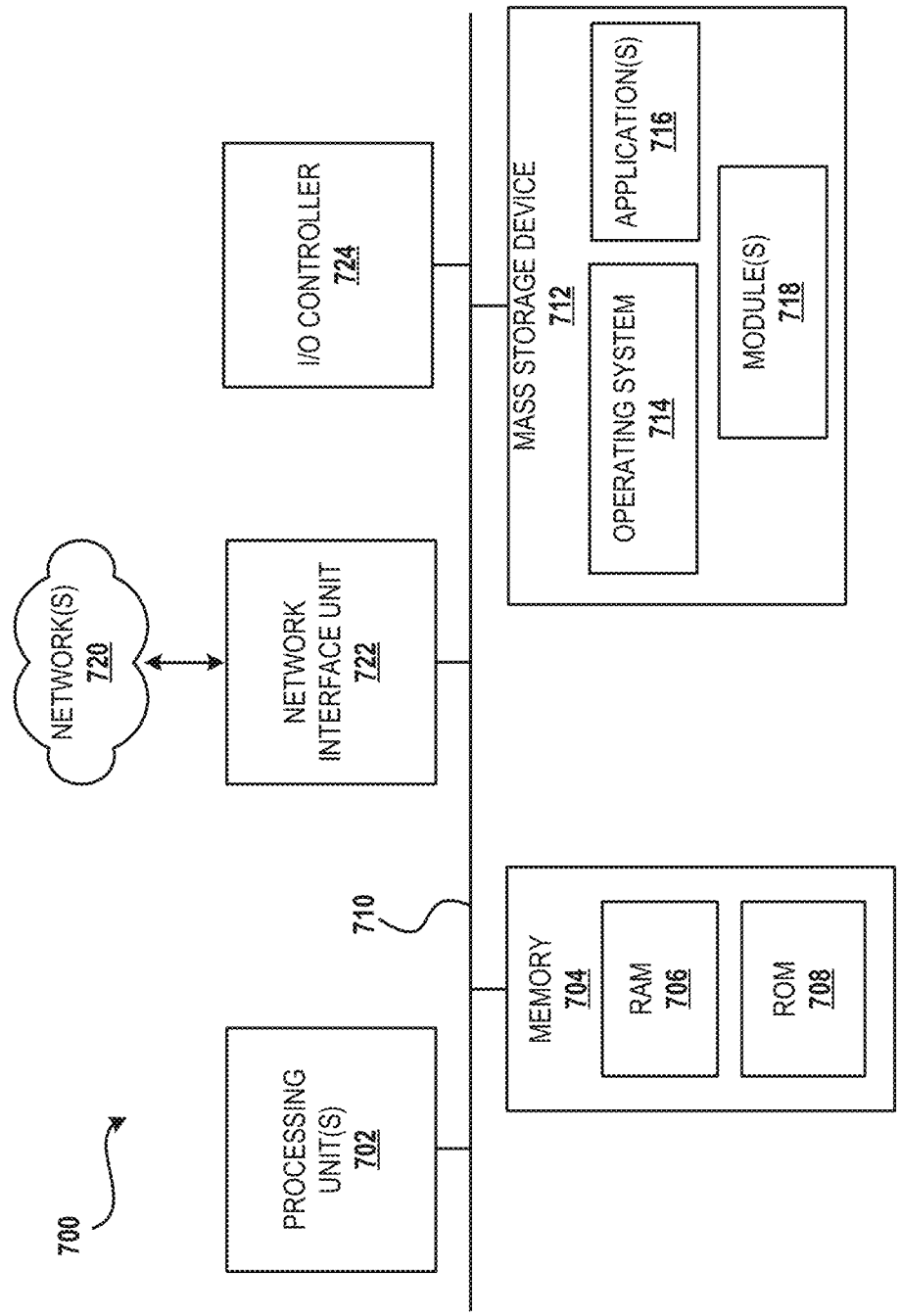
FIG. 7 is a computer architecture diagram illustrating an illustrative computer hardware and software architecture for a computing system capable of implementing aspects of the techniques and technologies presented herein.

FIG. 7 shows additional details of an example computer architecture 700 for a device, such as a computer or a server configured as part of the security system 102, capable of executing computer instructions (e.g., a module or a program component described herein). The computer architecture 700 illustrated in FIG. 7 includes processing unit(s) 702, a system memory 704, including a random access memory 706 ("RAM") and a read-only memory ("ROM") 708, and a system bus 710 that couples the memory 704 to the processing unit(s) 702.

Processing unit(s), such as processing unit(s) 702, can represent, for example, a CPU-type processing unit, a GPU-type processing unit, a field-programmable gate array (FPGA), another class of digital signal processor (DSP), or other hardware logic components that may, in some instances, be driven by a CPU. For example, and without limitation, illustrative types of hardware logic components that can be used include Application-Specific Integrated Circuits (ASICs), Application-Specific Standard Products (ASSPs), System-on-a-Chip Systems (SOCs), Complex Programmable Logic Devices (CPLDs), etc.

A basic input/output system containing the basic routines that help to transfer information between elements within the computer architecture 700, such as during startup, is stored in the ROM 708. The computer architecture 700 further includes a mass storage device 712 for storing an operating system 714, application(s) 716, modules 718 (e.g., the scoring module 132, the output module 134, the causality module 406), and other data described herein.

The mass storage device 712 is connected to processing unit(s) 702 through a mass storage controller connected to the bus 710. The mass storage device 712 and its associated computer-readable media provide non-volatile storage for the computer architecture 700. Although the description of computer-readable media contained herein refers to a mass storage device, it should be appreciated by those skilled in the art that computer-readable media can be any available computer-readable storage media or communication media that can be accessed by the computer architecture 700.

Computer-readable media can include computer storage media and/or communication media. Computer storage media can include one or more of volatile memory, non-volatile memory, and/or other persistent and/or auxiliary computer storage media, removable and non-removable computer storage media implemented in any method or technology for storage of information such as computer-readable instructions, data structures, program modules, or other data. Thus, computer storage media includes tangible and/or physical forms of media included in a device and/or hardware component that is part of a device or external to a device, including but not limited to random access memory (RAM), static random-access memory (SRAM), dynamic random-access memory (DRAM), phase change memory (PCM), read-only memory (ROM), erasable programmable read-only memory (EPROM), electrically erasable programmable read-only memory (EEPROM), flash memory, compact disc read-only memory (CD-ROM), digital versatile disks (DVDs), optical cards or other optical storage media, magnetic cassettes, magnetic tape, magnetic disk storage, magnetic cards or other magnetic storage devices or media, solid-state memory devices, storage arrays, network attached storage, storage area networks, hosted computer storage or any other storage memory, storage device, and/or storage medium that can be used to store and maintain information for access by a computing device.

In contrast to computer storage media, communication media can embody computer-readable instructions, data structures, program modules, or other data in a modulated data signal, such as a carrier wave, or other transmission mechanism. As defined herein, computer storage media does not include communication media. That is, computer storage media does not include communications media consisting solely of a modulated data signal, a carrier wave, or a propagated signal, per se.

According to various configurations, the computer architecture 700 may operate in a networked environment using logical connections to remote computers through the network 720. The computer architecture 700 may connect to the network(s) 720 through a network interface unit 722 connected to the bus 710. The computer architecture 700 also may include an input/output controller 724 for receiving and processing input from a number of other devices, including a keyboard, mouse, touch, or electronic stylus or pen. Similarly, the input/output controller 724 may provide output to a display screen, a printer, or other type of output device.

Network(s) 720 can include, for example, public networks such as the Internet, private networks such as an institutional and/or personal intranet, or some combination of private and public networks. Network(s) 720 can also include any type of wired and/or wireless network, including but not limited to local area networks (LANs), wide area networks (WANs), satellite networks, cable networks, Wi-Fi networks, WiMax networks, mobile communications networks (e.g., 3G, 4G, and so forth) or any combination thereof. Network(s) 720 can utilize communications protocols, including packet-based and/or datagram-based protocols such as internet protocol (IP), transmission control protocol (TCP), user datagram protocol (UDP), or other types of protocols. Moreover, network(s) 720 can also include a number of devices that facilitate network communications and/or form a hardware basis for the networks, such as switches, routers, gateways, access points, firewalls, base stations, repeaters, backbone devices, and the like.

It should be appreciated that the software components described herein may, when loaded into the processing unit(s) 702 and executed, transform the processing unit(s) 702 and the overall computer architecture 700 from a general-purpose computing system into a special-purpose computing system customized to facilitate the functionality presented herein. The processing unit(s) 702 may be constructed from any number of transistors or other discrete circuit elements, which may individually or collectively assume any number of states. More specifically, the processing unit(s) 702 may operate as a finite-state machine, in response to executable instructions contained within the software modules disclosed herein. These computer-executable instructions may transform the processing unit(s) 702 by specifying how the processing unit(s) 702 transition between states, thereby transforming the transistors or other discrete hardware elements constituting the processing unit(s) 702.

The disclosure presented herein also encompasses the subject matter set forth in the following clauses.

Example Clause A, a system comprising: one or more processing units; and a computer-readable storage medium having computer-executable instructions stored thereupon, which, when executed by the one or more processing units, cause the one or more processing units to: receive data associated with a threat detected based on a first operation that occurs in a data plane of a shared resource; access an activity log that includes a plurality of previous operations that occur in a control plane of the shared resource, the plurality of previous operations performed by a plurality of different users authorized to configure the shared resource via the control plane; for each previous operation of the plurality of previous operations, calculate an operation relevance score using a significance rating and an age rating, wherein: the significance rating is determined based on an association between a type of the previous operation that occurs in the control plane of the shared resource and a type of the threat detected based on the first operation that occurs in the data plane of the shared resource; and the age rating represents an amount of time between a time when the previous operation occurs and a time when the first operation occurs; identify a subset of the plurality of previous operations performed by each user of the plurality of different users; calculate a user relevance score for each user of the plurality of different users by summing a subset of operation relevance scores corresponding to the subset of the plurality of previous operations performed by each user of the plurality of different users; identify one or more most relevant persons to mitigate the threat by selecting one or more users with one or more highest user relevance scores; and cause an alert for the threat to be displayed, the alert indicating the most relevant person.

Example Clause B, the system of Example Clause A, wherein the alert includes contact information for the one or more most relevant persons.

Example Clause C, the system of Example Clause A or Example Clause B, wherein each user of the plurality of different users is defined as an owner or an administrator of the shared resource in accordance with a policy established for a client organization.

Example Clause D, the system of any one of Example Clauses A through C, wherein each of the one or more most relevant persons is equipped to investigate the alert and to mitigate the threat.

Example Clause E, the system of any one of Example Clauses A through D, wherein each of the plurality of previous operations occurs in a predefined time window established based on the time when the first operation occurs.

Example Clause F, the system of any one of Example Clauses A through E, wherein the computer-executable instructions further cause the one or more processing units to map the previous operation that occurs in the control plane of the shared resource to a corresponding significance rating stored in a significance rating table established for the type of the threat.

Example Clause G, the system of any one of Example Clauses A through F, wherein the computer-executable instructions further cause the one or more processing units to: identify a connection between the first operation that occurs in the data plane of the shared resource and a related previous operation that occurs in the control plane of the shared resource; and add a description of the connection to the alert.

Example Clause H, the system of Example Clause G, wherein the connection is identified from a plurality of predefined connections or a plurality of learned connections.

Example Clause I, a method comprising: receiving data associated with an event for a shared resource; accessing, by one or more processing units, an activity log that includes a plurality of previous operations performed on the shared resource by a plurality of different users; for each previous operation of the plurality of previous operations, calculating an operation relevance score using a significance rating and an age rating, wherein: the significance rating is determined based on an association between a type of the previous operation and a type of the event; and the age rating represents an amount of time between a time when the previous operation is performed and a time when the event is triggered; calculating a user relevance score for each user of the plurality of different users based on a subset of operation relevance scores corresponding to a subset of the plurality of previous operations performed by each user of the plurality of different users; identifying at least one most relevant person for receiving a notification of the event using the user relevance scores calculated for the plurality of different users; and causing the notification of the event to be displayed, the notification of the event indicating the at least one most relevant person.

Example Clause J, the method of Example Clause I, wherein each user of the plurality of different users is authorized to configure the shared resource in accordance with a policy established for a client organization.

Example Clause K, the method of Example Clause I or Example Clause J, wherein the at least one most relevant person comprises one or more users with one or more highest user relevance scores.

Example Clause L, the method of Example Clause I or Example Clause J, wherein the at least one most relevant person comprises users that have user relevance scores that exceed a threshold user relevance score.

Example Clause M, the method of any one of Example Clauses I through L, wherein the notification of the event includes contact information for the at least one most relevant person.

Example Clause N, the method of any one of Example Clauses I through M, wherein each of the plurality of previous operations is performed in a predefined time window established based on the time when the event is triggered.

Example Clause O, the method of any one of Example Clauses I through N, further comprising mapping the previous operation to a corresponding significance rating stored in a significance rating table established for the type of the event.

Example Clause P, the method of any one of Example Clauses I through O, further comprising: identifying a connection between the first operation and a related previous operation; and adding a description of the connection to the notification of the event.

Example Clause Q, a system comprising: one or more processing units; and a computer-readable storage medium having computer-executable instructions stored thereupon, which, when executed by the one or more processing units, cause the one or more processing units to: receive data associated with an event for a shared resource; access an activity log that includes a plurality of previous operations performed on the shared resource by a plurality of different users; for each previous operation of the plurality of previous operations, calculate an operation relevance score using a significance rating and an age rating, wherein: the significance rating is determined based on an association between a type of the previous operation and a type the event; and the age rating represents an amount of time between a time when the previous operation is performed and a time when the event is triggered; calculate a user relevance score for each user of the plurality of different users based on a subset of operation relevance scores corresponding to a subset of the plurality of previous operations performed by each user of the plurality of different users; identify at least one most relevant person for receiving a notification of the event using the user relevance scores calculated for the plurality of different users; and cause the notification of the event to be displayed, the notification of the event indicating the at least one most relevant person.

Example Clause R, the system of Example Clause Q, wherein each user of the plurality of different users is authorized to configure the shared resource in accordance with a policy established for a client organization.

Example Clause S, the system of Example Clause Q or Example Clause R, wherein the at least one most relevant person comprises (i) one or more users with one or more highest user relevance scores or (ii) users that have user relevance scores that exceed a threshold user relevance score.

Example Clause T, the system of any one of Example Clauses Q through S, wherein the notification of the event includes contact information for the at least one most relevant person.

Encoding the software modules presented herein also may transform the physical structure of the computer-readable media presented herein. The specific transformation of physical structure may depend on various factors, in different implementations of this description. Examples of such factors may include, but are not limited to, the technology used to implement the computer-readable media, whether the computer-readable media is characterized as primary or secondary storage, and the like. For example, if the computer-readable media is implemented as semiconductor-based memory, the software disclosed herein may be encoded on the computer-readable media by transforming the physical state of the semiconductor memory. For example, the software may transform the state of transistors, capacitors, or other discrete circuit elements constituting the semiconductor memory. The software also may transform the physical state of such components in order to store data thereupon.

Conditional language such as, among others, "can," "could," "might" or "may," unless specifically stated otherwise, are understood within the context to present that certain examples include, while other examples do not include, certain features, elements and/or steps. Thus, such conditional language is not generally intended to imply that certain features, elements and/or steps are in any way required for one or more examples or that one or more examples necessarily include logic for deciding, with or without user input or prompting, whether certain features, elements and/or steps are included or are to be performed in any particular example. Conjunctive language such as the phrase "at least one of X, Y or Z," unless specifically stated otherwise, is to be understood to present that an item, term, etc. may be either X, Y, or Z, or a combination thereof.

The terms "a," "an," "the" and similar referents used in the context of describing the invention (especially in the context of the following claims) are to be construed to cover both the singular and the plural unless otherwise indicated herein or clearly contradicted by context. The terms "based on," "based upon," and similar referents are to be construed as meaning "based at least in part" which includes being "based in part" and "based in whole" unless otherwise indicated or clearly contradicted by context.

It should be appreciated that any reference to "first," "second," etc. users or other elements within the Summary and/or Detailed Description is not intended to and should not be construed to necessarily correspond to any reference of "first," "second," etc. elements of the claims. Rather, any use of "first" and "second" within the Summary, Detailed Description, and/or claims may be used to distinguish between two different instances of the same element (e.g., two different resources, two different users, two different operations, etc.).

In closing, although the various configurations have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter. All examples are provided for illustrative purposes and is not to be construed as limiting.

What is claimed is:

1. A system comprising:
one or more processing units; and
a computer-readable storage medium having computer-executable instructions stored thereupon, which, when executed by the one or more processing units, cause the one or more processing units to:
receive data associated with a threat detected based on a first operation that occurs in a data plane of a shared resource;
access an activity log that includes a plurality of previous operations that occur in a control plane of the shared resource, the plurality of previous operations performed by a plurality of different users authorized to configure the shared resource via the control plane;
for each previous operation of the plurality of previous operations, calculate an operation relevance score using a significance rating and an age rating, wherein:
the significance rating is determined based on an association between a type of the previous operation that occurs in the control plane of the shared resource and a type of the threat detected based on the first operation that occurs in the data plane of the shared resource; and
the age rating represents an amount of time between a time when the previous operation occurs and a time when the first operation occurs;
identify a subset of the plurality of previous operations performed by each user of the plurality of different users;
calculate a user relevance score for each user of the plurality of different users by summing a subset of operation relevance scores corresponding to the subset of the plurality of previous operations performed by each user of the plurality of different users;
identify one or more most relevant persons to mitigate the threat by selecting one or more users with one or more highest user relevance scores; and
cause an alert for the threat to be displayed, the alert indicating the most relevant person.

2. The system of claim 1, wherein the alert includes contact information for the one or more most relevant persons.

3. The system of claim 1, wherein each user of the plurality of different users is defined as an owner or an administrator of the shared resource in accordance with a policy established for a client organization.

4. The system of claim 1, wherein each of the one or more most relevant persons is equipped to investigate the alert and to mitigate the threat.

5. The system of claim 1, wherein each of the plurality of previous operations occurs in a predefined time window established based on the time when the first operation occurs.

6. The system of claim 1, wherein the computer-executable instructions further cause the one or more processing units to map the previous operation that occurs in the control plane of the shared resource to a corresponding significance rating stored in a significance rating table established for the type of the threat.

7. The system of claim 1, wherein the computer-executable instructions further cause the one or more processing units to:
identify a connection between the first operation that occurs in the data plane of the shared resource and a related previous operation that occurs in the control plane of the shared resource; and
add a description of the connection to the alert.

8. The system of claim 7, wherein the connection is identified from a plurality of predefined connections or a plurality of learned connections.

9. A method comprising:
receiving data associated with an event for a shared resource;
accessing, by one or more processing units, an activity log that includes a plurality of previous operations performed on the shared resource by a plurality of different users;
for each previous operation of the plurality of previous operations, calculating an operation relevance score using a significance rating and an age rating, wherein:
the significance rating is determined based on an association between a type of the previous operation and a type of the event; and
the age rating represents an amount of time between a time when the previous operation is performed and a time when the event is triggered;
calculating a user relevance score for each user of the plurality of different users based on a subset of operation relevance scores corresponding to a subset of the plurality of previous operations performed by each user of the plurality of different users;
identifying at least one most relevant person for receiving a notification of the event using the user relevance scores calculated for the plurality of different users; and
causing the notification of the event to be displayed, the notification of the event indicating the at least one most relevant person.

10. The method of claim 9, wherein each user of the plurality of different users is authorized to configure the shared resource in accordance with a policy established for a client organization.

11. The method of claim 9, wherein the at least one most relevant person comprises one or more users with one or more highest user relevance scores.

12. The method of claim 9, wherein the at least one most relevant person comprises users that have user relevance scores that exceed a threshold user relevance score.

13. The method of claim 9, wherein the notification of the event includes contact information for the at least one most relevant person.

14. The method of claim 9, wherein each of the plurality of previous operations is performed in a predefined time window established based on the time when the event is triggered.

15. The method of claim 9, further comprising mapping the previous operation to a corresponding significance rating stored in a significance rating table established for the type of the event.

16. The method of claim 9, further comprising:
identifying a connection between the first operation and a related previous operation; and
adding a description of the connection to the notification of the event.

17. A system comprising:
one or more processing units; and
a computer-readable storage medium having computer-executable instructions stored thereupon, which, when executed by the one or more processing units, cause the one or more processing units to:
receive data associated with an event for a shared resource;

access an activity log that includes a plurality of previous operations performed on the shared resource by a plurality of different users;

for each previous operation of the plurality of previous operations, calculate an operation relevance score using a significance rating and an age rating, wherein:

the significance rating is determined based on an association between a type of the previous operation and a type of the event; and the age rating represents an amount of time between a time when the previous operation is performed and a time when the event is triggered;

calculate a user relevance score for each user of the plurality of different users based on a subset of operation relevance scores corresponding to a subset of the plurality of previous operations performed by each user of the plurality of different users;

identify at least one most relevant person for receiving a notification of the event using the user relevance scores calculated for the plurality of different users; and cause the notification of the event to be displayed, the notification of the event indicating the at least one most relevant person.

18. The system of claim 17, wherein each user of the plurality of different users is authorized to configure the shared resource in accordance with a policy established for a client organization.

19. The system of claim 17, wherein the at least one most relevant person comprises (i) one or more users with one or more highest user relevance scores or (ii) users that have user relevance scores that exceed a threshold user relevance score.

20. The system of claim 17, wherein the notification of the event includes contact information for the at least one most relevant person.

* * * * *